(12) United States Patent
MacQuoid

(10) Patent No.: US 6,881,345 B2
(45) Date of Patent: Apr. 19, 2005

(54) DISPOSABLE FLUID CHANGING KIT AND METHOD OF DISPOSING OF THE SAME

(76) Inventor: Malcolm MacQuoid, P.O. Box 681130, Park City, UT (US) 84068-1130

( * ) Notice: Subject to any disclaimer, the term of this patent is extended or adjusted under 35 U.S.C. 154(b) by 0 days.

(21) Appl. No.: 10/272,398

(22) Filed: Oct. 14, 2002

(65) Prior Publication Data

US 2003/0070989 A1 Apr. 17, 2003

Related U.S. Application Data

(60) Provisional application No. 60/374,230, filed on Apr. 19, 2002, and provisional application No. 60/329,659, filed on Oct. 16, 2001.

(51) Int. Cl.[7] .............................. F16C 3/14; F16C 33/00; B01D 15/00
(52) U.S. Cl. ........................... 210/660; 210/663; 431/2; 184/1.5
(58) Field of Search ............................... 431/2; 184/1.5, 184/1–5, 106; 210/660, 663, 679, 680, 690; 134/7; 435/305.1; 141/10; 220/573

(56) References Cited

U.S. PATENT DOCUMENTS

| | | |
|---|---|---|
| 3,396,810 A | 8/1968 | Andrews |
| 3,590,937 A | 7/1971 | Andrews |
| 3,653,459 A | 4/1972 | Andrews |
| 3,669,204 A | 6/1972 | Andrews |
| 3,703,464 A | 11/1972 | Ferm |
| 3,809,175 A | 5/1974 | Andrews |
| 3,960,722 A * | 6/1976 | Tomikawa et al. ............ 210/680 |
| 4,061,567 A * | 12/1977 | Kobayashi et al. ........... 210/691 |
| 4,098,398 A * | 7/1978 | Meyers ......................... 206/223 |
| 4,102,783 A * | 7/1978 | Zenno et al. ................. 210/691 |
| 4,172,039 A | 10/1979 | Akiyama |
| 4,258,659 A | 3/1981 | Rowell |
| 4,341,180 A | 7/1982 | Cortigene et al. |
| 4,507,144 A | 3/1985 | Aloni |
| 4,537,877 A | 8/1985 | Ericsson |
| 4,570,573 A | 2/1986 | Lohman |
| 4,605,640 A * | 8/1986 | Fanta et al. .................. 502/402 |
| 4,627,382 A | 12/1986 | Muzzey |
| 4,705,248 A | 11/1987 | McIntyre |
| 4,721,059 A | 1/1988 | Lowe et al. |
| 4,723,510 A | 2/1988 | Skillstad |
| 4,734,393 A | 3/1988 | Lowe et al. |
| 4,738,286 A | 4/1988 | McIntyre |
| 4,762,155 A * | 8/1988 | Gruber .......................... 141/10 |
| 4,875,537 A | 10/1989 | Garnatz et al. |
| 4,925,343 A | 5/1990 | Raible et al. |
| 5,037,557 A | 8/1991 | Warrenchak et al. |
| 5,051,173 A * | 9/1991 | Hoelzl .......................... 210/143 |
| 5,060,598 A | 10/1991 | Richards |

(Continued)

FOREIGN PATENT DOCUMENTS

| | | | |
|---|---|---|---|
| EP | 0 788 736 A1 | 8/1997 | |
| JP | 08170018 A * | 7/1996 | ........... C08L/83/04 |
| WO | WO 98/07804 | 2/1998 | |

OTHER PUBLICATIONS www.recycleoil.org/usedoilflow.htm downloaded Jun. 24, 2003.* http://www.axfordsabode.org.uk/torreycn.htm, "The Breaking-up of the oil tanker Torrey Canyon," Sep. 21, 1998, (downloaded May, 14, 2004).*

*Primary Examiner*—Chester T. Barry
(74) *Attorney, Agent, or Firm*—Bateman IP Law Group

(57) ABSTRACT

A fluid change kit for disposing of fluids, such as automotive fluids, includes a container at least partially filled with an absorbent. The fluid change kit typically includes a biodegradable box and an absorbent selected from peat moss and coconut coir for absorbing the fluid. A liner may also be included. By absorbing the fluid, the fluid change kit can be disposed of in a conventional landfill.

14 Claims, 4 Drawing Sheets

U.S. PATENT DOCUMENTS

| | | | | |
|---|---|---|---|---|
| 5,060,849 A | * | 10/1991 | King | 229/101 |
| 5,074,379 A | | 12/1991 | Batrice | |
| 5,180,033 A | * | 1/1993 | Wilson | 184/1.5 |
| 5,215,407 A | | 6/1993 | Brelsford | |
| 5,221,043 A | * | 6/1993 | Hardy | 237/19 |
| 5,404,209 A | * | 4/1995 | Matsuoka et al. | 399/249 |
| 5,419,945 A | | 5/1995 | Lopez | |
| 5,458,662 A | | 10/1995 | Tyone | |
| 5,630,377 A | | 5/1997 | Kumlin | |
| 5,716,840 A | * | 2/1998 | Kahler et al. | 435/264 |
| 5,727,499 A | | 3/1998 | Armington et al. | |
| 5,839,674 A | | 11/1998 | Ellis | |
| 5,840,632 A | | 11/1998 | Miller | |
| 5,885,053 A | * | 3/1999 | Deye | 414/722 |
| 5,922,189 A | * | 7/1999 | Santos | 208/13 |
| 5,942,457 A | * | 8/1999 | Santos | 502/27 |
| 6,027,652 A | | 2/2000 | Hondroulis et al. | |
| 6,085,806 A | | 7/2000 | Davis et al. | |
| 6,107,242 A | | 8/2000 | Ackerman et al. | |
| 6,189,260 B1 | * | 2/2001 | Kusey et al. | 47/9 |
| 6,241,116 B1 | * | 6/2001 | Schrepfer et al. | 220/581 |
| 6,271,190 B1 | | 8/2001 | Boskamp et al. | |
| 6,286,626 B1 | | 9/2001 | Evans | |
| 6,322,734 B1 | | 11/2001 | Zanten et al. | |
| 6,365,214 B1 | * | 4/2002 | Kirk | 426/330.6 |
| 6,391,120 B1 | * | 5/2002 | Silva | 134/7 |
| 6,395,166 B1 | * | 5/2002 | Haydock | 208/179 |
| 6,408,568 B1 | * | 6/2002 | Kusey et al. | 47/9 |
| 6,506,307 B1 | * | 1/2003 | Hondroulis et al. | 210/671 |
| 6,620,321 B1 | * | 9/2003 | Festa et al. | 210/602 |

* cited by examiner

DISPOSABLE FLUID CHANGING KIT AND METHOD OF DISPOSING OF THE SAME

RELATED APPLICATIONS

The present invention claims the benefit of U.S. Provisional Patent Application No. 60/329,659, filed Oct. 16, 2001, and U.S. Provisional Patent Application No. 60/374,230, filed Apr. 19, 2002.

BACKGROUND OF THE INVENTION

1. Field of the Invention

The present invention relates to a disposable fluid changing kit and to a method for changing fluids in an automobile. More particularly, the present invention relates to a disposable automotive fluid changing kit which enables the fluid to be drained directly into the container and disposed of without recycling. The present invention further relates to method of disposing of the oil containing change kit.

2. State of the Art

Even though society has become increasingly efficient, individuals must still spend time for routine maintenance on their vehicles. Such routine maintenance includes changing the motor oil and other fluids in the vehicle. While habits vary between individuals, most automotive companies suggest changing the oil every three months or three to five thousand miles. Thus, at least four times per year, a person in required to have a car serviced.

Many vehicle owners are stranded at service centers while waiting for the maintenance to be finished. Others are inconvenienced by resorting to a courtesy van or finding another source of transportation for work while the vehicle is being serviced. These individuals not only waste time driving to the service center, but are also confined to the dealer's service schedule. For those managing the maintenance of a rental or service fleet, this inconvenience can also be a significant logistical problem.

Although many "quick lube" businesses have been established to perform quick oil (and other fluid) changes, these businesses do not make house calls. In other words, individuals employing these services must still travel to the "quick lube" location. Thus, this presents the same problems and basic inconveniences of taking time out of the day to travel to the quick lube center and wait for the vehicle to be serviced.

Many automobile owners would prefer to perform these periodic fluid changes themselves for a number of reasons. First, the expense of performing the change is generally less than paying a service station, etc., to perform the work. Additionally, some individuals simply enjoy the hands-on work and the satisfaction of taking care of their automobile. This is especially true of those who have classic automobiles or automobiles that have been customized. Furthermore, if an automotive service center which performs oil and other fluid changes is not nearby, it can take less time to simply change the oil for oneself.

For those who may wish to change their own oil for economic reasons, there are several drawbacks. First, the owner must crawl underneath the car while it is parked in the garage or on the driveway in order to gain access to the engine oil drain plug and oil filter (or other fluid plugs). The short distance between the bottom of the vehicle and the surface on which it is parked make this a very difficult task.

Secondly, most home oil changing methods currently available consist of some type of apparatus into which the oil is drained. This method then requires the vehicle owner to dispose of a container full of sloshing, dirty motor oil.

In order to comply with most local governmental regulations, the oil or other fluids drained from an automobile must be transported to a recycling center or other establishment that accepts used automotive fluids for recycling. Because of the potential hazard of spilling the used oil in the car or on one's clothes while transporting it to be recycled, there is a strong tendency among home oil changers to forego recycling and simply dump the oil, either in a garbage can, down a drain or onto the ground. The oil from a single oil change can contaminate up to one million gallons of drinking water if not disposed of properly. Because of the great risk such fluids pose to the environment, improper disposal of oil is illegal.

To avoid illegally disposing of oil, used motor oil is frequently simply stored in the garage or a shed. While most intend to properly dispose of the oil, etc. the oil often sits for months and poses a health hazard for children who might drink or otherwise play with the oil. In addition, it presents a risk that it might spill and run into the ground or down a storm drain, causing further contamination. As a result, it is estimated that less than 10% of the used motor oil for home oil changes in United States is actually recycled at designated facilities. Thus, a large amount of oil is unaccounted for. This oil is either being dumped—creating environmental damage, or stored improperly—creating health risks for children and pets.

Presently, there is not generally available a method for disposing of motor oil and other automotive fluids which is convenient, safe and easy to use. Thus, there is a need for an inexpensive, simple and relatively clean method for changing and disposing of used motor oil and other automotive fluids.

SUMMARY OF THE INVENTION

Thus, it is an object of the present invention to provide an apparatus and method for disposing of used automotive fluids which is relatively inexpensive and easy to use.

The present invention involves using a natural absorbent in a container into which the used automotive fluid can be drained so that the absorbent captures the oil to substantially eliminate leakage of the oil.

In accordance with one aspect of the invention, the container is at least partially filled with peat moss. When the oil or other automotive fluid is drained into the peat moss, the peat moss absorbs the fluid, thereby preventing it from leaking. In some locations, if the amount of peat moss in the container is sufficient to hold the fluid that the container with no leakage, the container can be disposed of in a conventional land fill. Thus, the vehicle owner is able to legally discard the container in the trash. The peat moss holds the oil sufficiently that the oil is given time to be acted on by microbes with biodegrade the oil, thereby preventing contamination of the soil and preventing groundwater contaminating.

In accordance with another aspect of the present invention, the container is at least partially filled with coconut coir. Coconut coir is formed during the processing of coconuts husks. The coconut coir is traditionally discarded as a waste by-product of processing the coconuts, although it is occasionally used as a soil supplement in agriculture. The tremendous volume of coconut coir that is produced as a by-product of coconut processing has always presented a disposal concern to coconut processors. The coconut coir is generally left in large piles near the location where the coconuts are processed. Piles of discarded coconut coir present a potential hazard for the coconut industry as the piles are a fertile habitat and breeding ground for species of beetles which are harmful to coconut trees.

Coconut coir, however, is extremely absorbent and is completely biodegradable. Thus, it is an excellent material to use to absorb, store, transport and dispose of used motor oil. When a container full of coconut coir is placed under a vehicle and the oil drained into the coir, the coir quickly absorbs the oil and retains it in a generally "solid" form. Once the oil has been absorbed by the coconut coir, the container and its contents can be disposed of in traditional landfills.

In accordance with still another object of the invention, the container has a plastic or other fluid impermeable liner. While the peat moss or coconut coir will absorb the oil, etc., the liner prevents leakage in the event that all of the fluid is quickly dumped in one location. In other words, the liner provides additional time for the absorbent to absorb the fluid and to prevent leakages.

After the oil is drained into the box, the top of the plastic liner is closed with a twist tie. The box is then closed and is ready for disposal. Motor oil that has been drained into and absorbed by the coconut coir can be disposed of at most landfills. This is because when it is absorbed by the coconut coir, the motor oil is trapped by the coconut coir and cannot migrate. Thus, it doesn't present the problem of offsite migration that motor oil in its liquid form presents.

The present invention also presents a biodegradable solution to the problem of waste oil disposal. As pointed out before, because the oil is bound to the coconut coir, the entire box containing the coconut coir and used motor oil can be disposed of in a landfill without danger that the oil will migrate offsite. Coconut coir is biodegradable and it is well known that naturally existing microbes can degrade hydrocarbons, such as oil. Therefore, the peat moss or coconut coir and oil (fluid, etc.) will break down over time in the landfill without offsite migration of the fluid. This is in sharp contrast to the groundwater and surface water contamination that has been caused by dumping used motor oil. Additionally, the container of coconut coir and used automotive fluids can be disposed of in the trash.

Because method and apparatus of the present invention provide a relatively simple, cheap and clean method for changing and disposing of motor oil, people who use this invention will have a greater tendency to properly dispose of their used motor oil, rather than storing it in their garages or dumping on the ground or down the drain. Thus, this invention represents an environmentally friendly method of changing and disposing of motor oil.

Using coconut coir as a used motor oil receptacle also helps solve the problem of disposing of coconut coir because it creates a useful market for an otherwise unmarketable waste byproduct from coconut processing. Using the waste coconut coir as a used motor oil receptacle therefore helps to eliminate the piles of coconut coir from the coconut processing sites where it tends to present disposal concern if unneeded for agricultural uses.

The present invention is also superior to traditional motor oil changing methods in that it is completely disposable. One of the problems with traditional motor oil changing methods is that even if the oil is recycled, the pan or other receptacle into which the oil was drained, stored and/or transported generally contains a film of oil residue on its inside surfaces, and this contaminated container must be stored in the garage or other place in or near the house where it tends to present a health hazard to children or others who might ingest the oil. At the very least, storing containers that have been contaminated with dirty oil is not aesthetically desirable. Because the present invention is disposable, all the oil and oil residue are disposed of and there is no contaminated container left over to deal with.

In accordance with another aspect of the invention, the present invention involves burning the boxes containing used motor oil at a sufficiently high temperature to minimize or remove any pollutants and to reduce any unburned residue to a very small amount of ash. The boxes are burned in an incinerator that is specially designed to burn the boxes at a very high temperature. The high temperature ensures that any potential pollutants are completely consumed.

In a preferred embodiment, the used boxes are incinerated in the SMART ASH brand incinerator. The SMART ASH incinerator is manufactured by ELASTEC, 121 Council St., Carmi, Ill. 62821. The SMART ASH incinerator utilizes a 55 gallon drum as the burn chamber. The drum is filled with combustible material including paper, rags, wood or waste oil mixed with coconut coir or peat moss. The only fuel required is the material to be incinerated.

The incinerator utilizes two electric high velocity blowers to circulate large volumes of air in the burn chamber to increase the burn temperature and thus increase the burn rate. This, in turn, eliminates pollutants, and reduce volume of the remaining ash. Due to the high temperature burn, the SMART ASH incinerator, or any other high temperature incinerator, will sufficiently burn pollutants that the emissions satisfy EPA requirements for incinerating petroleum products.

In accordance with another aspect of the invention, the incinerator is connected to the heating system of a building, such as the retail automotive parts store or a service garage. As the incinerator burns the boxes of coconut coir (or peat moss) and used motor oil, a significant amount of heat is generated. Rather then wasting the resultant heat, the heat from the burning boxes is captured and used as a heat source for the building. Thus, instead of used motor oil raising recycling issues and generally being a burden on automobile parts stores, etc., the used motor oil can be used as a heat source which decreases the operating expenses of the store. This is particularly beneficial for garages and the like which are remote from recycling centers which will accept used motor oil.

Incinerating the boxes containing the used motor oil in this manner also solves the problem of adding more solid waste to our already overburdened landfills. Because most of the volume contained in the coconut coir—cardboard box—used motor oil combination is converted to gas and heat, only a very small percentage of the original volume remains as ash. This ash can readily be discarded in a landfill without significantly adding to the solid waste disposal problem.

Further, this invention provides an actual positive incentive for retailers of motor oil to accept used motor oil. The oil comes in an essentially solid form as the motor oil is contained by the coconut coir. Thus, the retailer does not face the problem of handling and storing and transporting liquid motor oil with its attendant mess and risk of spilling. Further, the retailer is not faced with the task of finding a recycler willing to take the used motor oil, or of transporting the material for recycling to centers which may be very remote from the retailer.

In accordance with another aspect of the invention, the motor oil need not be received from the customer (or a service garage attached to the store) in the boxes with coconut coir (or peat moss). Rather, motor oil can be received from customers in conventional containers. The motor oil can then be mixed with coconut coir and placed in the incinerator directly or in a container. The coconut coir/motor oil mixture is then incinerated, disposing of the oil and providing a potential heat source for the store. Thus, the customer and garage or retailer is relieved of the burden of locating recycling facilities, and the business is further provided with a mechanism for supplementing the heating of the business.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

Figure 1:
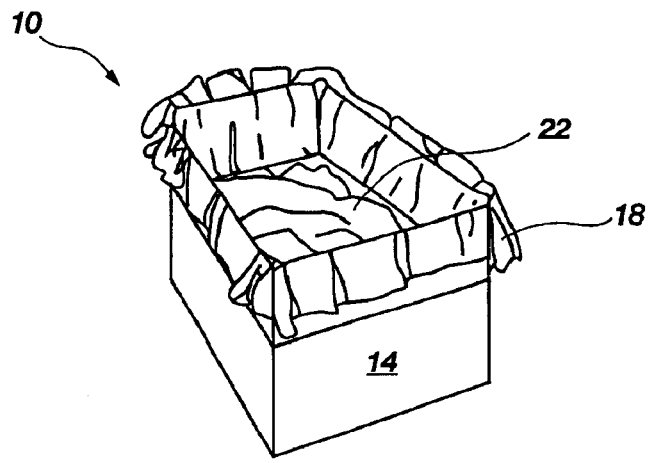
FIG. 1 shows a perspective view of a fluid change kit formed in accordance with the principles of the present invention.

Turning now to FIG. 1, there is shown a perspective view of the fluid change kit, generally indicated at 10. The fluid change kit typically includes a container 14, a liner 18 and absorbent 22. The container 14 is preferably made from a biodegradable material, such as cardboard. The container will typically be taped closed at the point of sale to prevent removal of the liner 18 and absorbent until the kit 10 is ready for use.

While the liner 18 is optional, it is preferred to keep fluid from leaking from the container 14 until the absorbent has a chance to absorb the oil, etc., and prevent is from mobilizing through the soil, etc. Those skilled in the art will appreciate that the container could also be coated with materials to prevent leakage of the oil, etc., while it is absorbed by the coconut coir or peat moss.

The absorbent is preferably formed from a highly absorbent natural material such as peat moss or coconut coir, or mixtures containing one or both of these materials. Coconut coir is the most preferred embodiment for several reasons. Unlike peat moss which is "mined" for a number of uses, coconut coir is a renewable resource. Rather than creating environmental damage, the use of coconut coir actually removes the excessive amounts of coir which are generated in the processing of coconuts and which can become an ecological nuisance. Using the coconut coir has the double benefit of promoting responsible disposal of oil, etc., and removing a waste byproduct from many tropical areas.

In addition to the environmental benefits, coconut coir is simply a wonderful absorbent of oil. Coconut coir can absorb up to nine times its own weight in oil. Thus, a relatively light weight amount of coconut coir can absorb a considerable amount of oil. A container 14 which is 9 inches by 12 inches by 5 inches filled about ⅔ full of coconut coir can receive and hold up to six quarts of oil.

Figure 2:
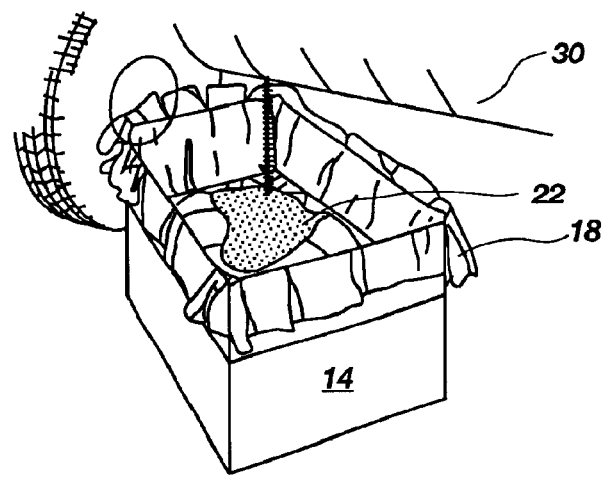
FIG. 2 shows a perspective view of the fluid change kit and a fragmented view of an automobile with the oil from the automobile being drained into the fluid change kit.

In use, the container 14 is opened and the liner is wrapped over the flaps of the container as shown in FIG. 1. The fluid change kit 10 is then slid under the oil pan, etc., of the automobile and the fluid released. The fluid drains from the automobile 30 into the coconut coir or peat moss 22 in the container 14 and is absorbed as shown in FIG. 2.

Figure 3:
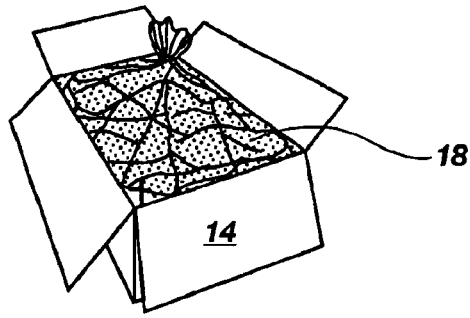
FIG. 3 shows a perspective view of the oil change kit with the liner closed to prevent escape of the fluid and absorbent.

Once the oil, etc., has drained from the automobile 30, the plug can be replaced and the fluid change kit 10 is pulled from under the automobile. A twist tie or rubber band is then used to tie the liner 18 closed as shown in FIG. 3. The liner 18 traps the oil, etc., and allows the absorbent 22 sufficient time to fully absorb the fluid.

In most locations, the container 14 and its contents can then be disposed of in a traditional land fill or in the weekly trash pick-up. Because disposal with the fluid change kit is so easy, the likelihood of compliance increases significantly, and the risk that the oil, etc., will be poured down the drain or otherwise improperly thrown away is reduced dramatically.

Figure 4:
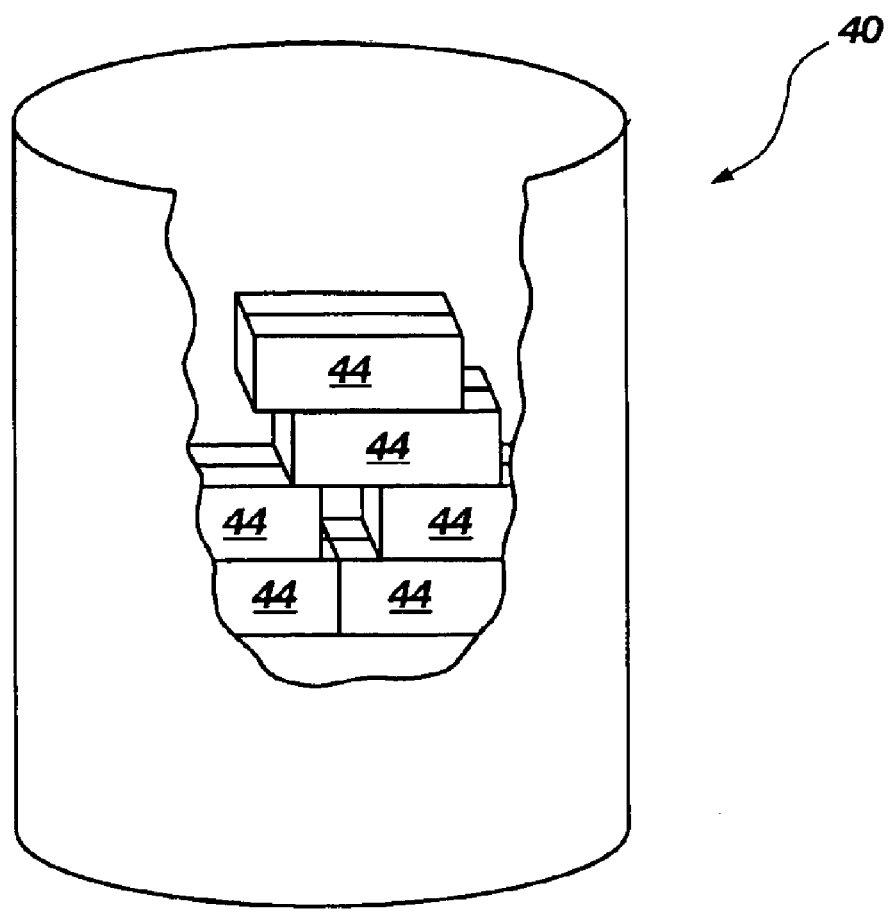
FIG. 4 shows cut-away view of a drum holding boxes of used motor oil in accordance with one aspect of the principles of the present invention.

While disposing of the fluid change kit in a landfill is convenient, it is not the best use of the fluid filled kit. Turning now to FIG. 4, there is shown a perspective, partially cut-away view of a drum, generally indicated at 40. Disposed in the drum 40 is a plurality of boxes 44. The boxes 44 are filled with a mixture of used motor oil and a natural material, such as coconut coir or peat moss. Coconut coir is preferred, both due to its absorbent capacity and the relative ease with which it burns.

The boxes 44 have been preferably filled with motor oil in accordance with the method taught above. In the alternative, the boxes could be filled with coconut coir and then have motor oil which has been brought to an automotive supply store for disposal added thereto.

Typically the drum will be filled with about fifty pounds worth of boxes. Because they are in the drum, there is little likelihood of oil leaking out of the boxes and contaminating the area even if far too much oil is poured into a box.

Figure 5:
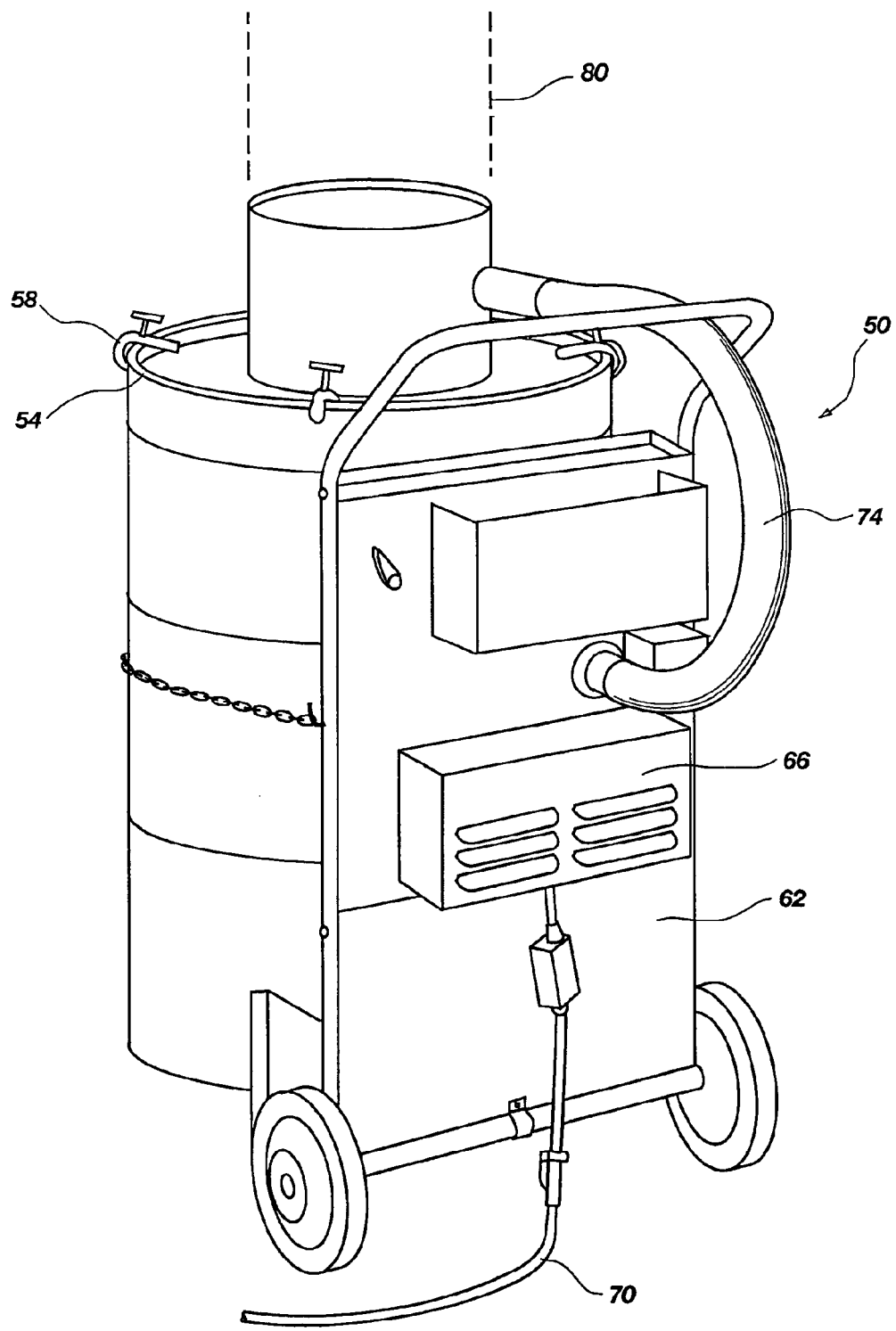
FIG. 5 shows a perspective view of an incinerator incorporating the drum of FIG. 4.

Turning now to FIG. 5, there is shown a perspective view of an incinerator, generally indicated at 50, for use in accordance with the principles of the present invention. The incinerator 50 includes a lid 54 which is configured to rest on the open top of the drum 40. The lid 54 preferably includes a plurality of clamps 58 to hold the lid to the drum 40. While the SMART ASH incinerator is preferred, numerous other incinerators can also be used.

The incinerator 50 also preferably includes a cart 62 which holds the barrel and holds a fan mechanism 66 which is typically powered by a power cord 70 connected to an A/C outlet. The fan forces air through a tube 74 and into the drum 40 through the lid 54. The forced air causes intense heat to be generated from the fire. It also causes the materials in the drum to be reduced significantly. Typically, the ash left over after the burn is about 3 percent of the original volume. Thus, the effect on land fills is dramatically reduced.

The incinerator 50 will typically burn about 50 pounds of waste in an hour and generate considerable heat. In addition to the mixture of oil and coconut coir or peat moss, other materials can also be added to provide heat and reduce waste. Such materials may include oil stained rags, and other debris associated with servicing automobiles and the like.

In order to take full advantage of the heat generated by burning the oil/coconut coir mixture, the incinerator 20 is preferably connected to duct work 80 or some other mechanism for directing the hot gasses emitted from the incinerator and using those gasses for heating an area. In colder climates, the hot gasses could be used to help heat the store, thereby reducing heating costs, while simultaneously reducing disposal costs.

Figure 6:
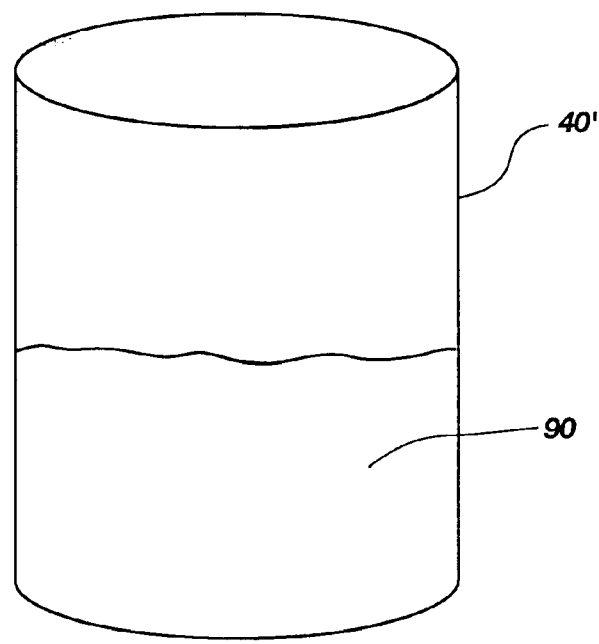
FIG. 6 shows a perspective view of a drum in accordance with an alternate embodiment of the invention.

Turning now to FIG. 6, there is shown a perspective view of a drum 40'. Rather than being filled with boxes, the drum is filled with coconut coir 90 (or peat moss). When used motor oil is brought to the location, it is emptied into the coconut coir. The coconut coir 90 absorbs the oil and prevents a spill from contaminating the area in the event that the drum 40' is accidentally turned over. Rather than oil flowing all over, the coconut coir 90 and oil mixture can simply be scooped back into the drum 40' and burned in due course. This is particularly advantageous to automobile service garages which conduct a large number of oil changes. The coconut coir 90 keeps the oil from being an environmental hazzard until it is burned, and increases the heat generated during the burning process. That heat may then be used to reduce the cost of utilities for the business.

Figure 7:
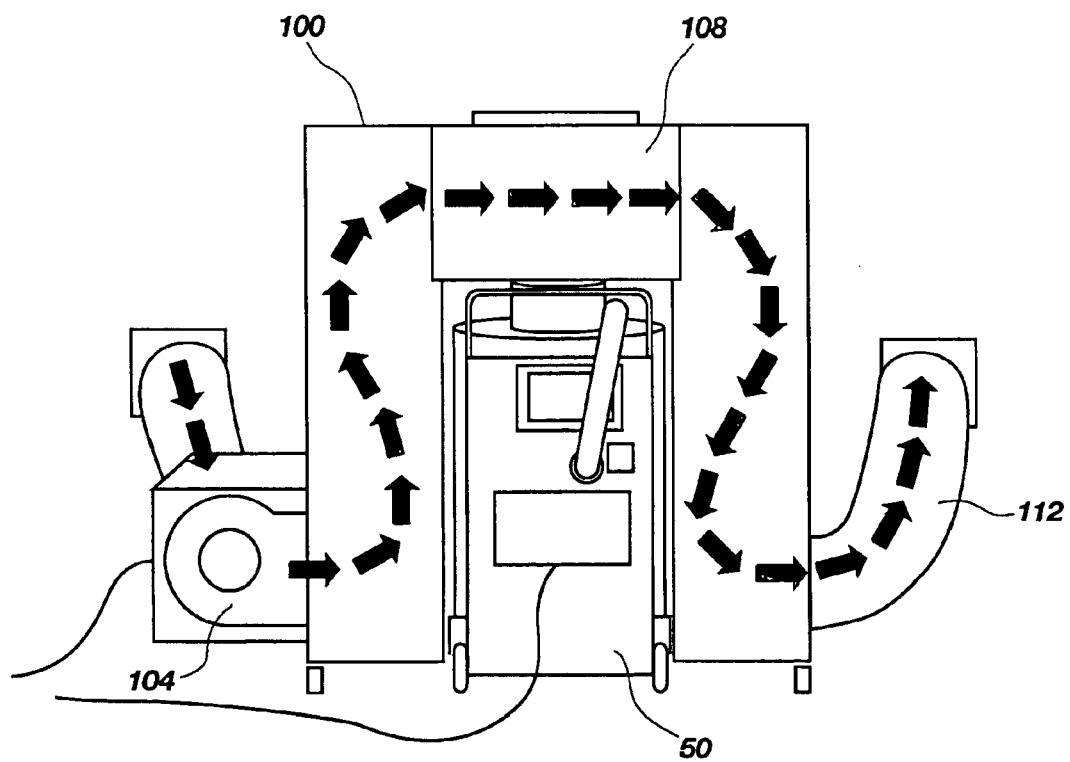
FIG. 7 shows a schematic view of a furnace system heated by an incinerator having boxes filled with used motor oil in accordance with the principles of the present invention.

Turning now to FIG. 7, there is shown a schematic view of a furnace, generally indicated at 100. The furnace 100 is powered by the incinerator 50. Air to be heated is drawn in through a blower 104 which passes the cold air through a heat exchanger 108, wherein the heat from the incinerator 50 warms the air. The warmed air is then passed through a heating duct 112 into the building. Because the air being circulated for heat is isolated from the exhaust of the incinerator, there is little likelihood of any contaminants which might be present from being accidentally pumped into the building. A device such as that shown in FIG. 7 is available from Elastec, Inc., Carmi, Ill.

Using an incinerator 50 and furnace 100 such as the SMART ASH and SMART HEAT with the oil disposal boxes of the present invention is particularly advantageous. Coconut coir is not only highly absorbent, it is also flammable when impregnated with oil. Thus, considerable heat can be generated from the used motor oil, with little mess and with little risk of environmental contamination. This is far superior to the present system in which a fraction of the motor oil changed by hobbyists, etc. is properly disposed of or recycled.

Thus there are disclosed an improved fluid change kit and method of using the same. Furthermore, there is disclosed an improved method for disposing of used oil and other fluids of automobiles and the like. Those skilled in the art will appreciate numerous modifications which can be made without departing from the scope and spirit of the present invention. For example the same methods can be used to dispose of fluids from other vehicles including boats, ATVs and lawn mowers. The appended claims are intended to cover such modifications.

What is claimed is:

1. A method for disposing of an automotive fluid, the method comprising:
    selecting a container having an absorbent selected from the group consisting of coconut coir and peat moss;
    draining the automotive fluid into the absorbent;
    disposing of the container and absorbent; and
    disposing of the container and absorbent in a land fill.

2. A method for disposing of an automotive fluid, the method comprising:
    selecting a container having an absorbent selected from the group consisting of coconut coir and peat moss;
    draining the automotive fluid into the absorbent;
    disposing of the container and absorbent; and
    disposing of the container and absorbent in a trash can.

3. A method for disposing of used motor oil, the method comprising forming a mixture of motor oil and a material comprising either coconut coir or peat moss and burning the mixture and utilizing heat therefrom to heat a building.

4. A method for disposing of motor oil, the method comprising:
    pouring the motor oil into a container;
    mixing the motor oil with coconut coir or peat moss so the motor oil is substantially absorbed into the coconut coir or peat moss in the container;
    wherein the motor oil and coconut coir or peat moss and the container is burned; and
    wherein heat from the burning is used to warm a building.

5. A method for disposing of fluid from a vehicle, the method comprising:
    pouring the fluid into a container having coconut coir to form a mixture of the fluid and coconut coir and
    burning the container and the mixture in an incinerator subject to forced air to produce heat for heating a building or vehicle.

6. The method according to claim 1, the method comprising selecting a container lined with plastic.

7. The method according to claim 1, the method comprising selecting a container wherein the container comprises paper products.

8. The method according to claim 1, the method comprising selecting a container wherein the container is formed from cardboard.

9. The method according to claim 2, the method comprising selecting a container lined with plastic.

10. The method according to claim 2, the method comprising selecting a container wherein the container comprises paper products.

11. The method according to claim 2, the method comprising selecting a container wherein the container is formed from cardboard.

12. The method according to claim 4, the method comprising selecting a container lined with plastic.

13. The method according to claim 4, the method comprising selecting a container wherein the container comprises paper products.

14. The method according to claim 4, the method comprising selecting a container wherein the container is formed from cardboard.

* * * * *